United States Patent Office 2,909,435
Patented Oct. 20, 1959

2,909,435

COATING OF RAISINS AND OTHER FOODS

Glenn G. Watters, Sebastopol, and John E. Brekke, Berkeley, Calif., assignors to the United States of America as represented by the Secretary of Agriculture No Drawing. Application February 24, 1958
Serial No. 717,277

11 Claims. (Cl. 99—168)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its primary object the application of protective coatings to raisins and other foods.

A problem with which the invention is especially concerned is explained below, having particular reference to raisins. It is to be understood however that the invention is not limited to the coating of raisins but is of general applicability to foods of all kinds.

It is well known in the industry that on storage, raisins are subject to certain deleterious changes. For example, if raisins are stored in a moist atmosphere, they absorb moisture from their environment becoming sticky and clumping together. If their moisture content rises high enough, they become moldy and inedible. On the other hand, if they are stored in a dry atmosphere, they tend to lose moisture whereby they lose their original softness and become tough or even hard and flinty. The drying out of raisins is particularly noticed where the fruit is packed with cereal products such as cornflakes, bran, or other breakfast-cereal products. In such cases the cereal acts as a desiccant in that it causes a diffusion of moisture from the raisins through the atmosphere within the package and eventually to the cereal. Under these circumstances if the raisin-containing cereal stands on the grocer's shelf for any appreciable time, the raisins become tough and the taste appeal of the mixed cereal is vitiated. Various coatings for raisins such as pectin, waxes, fats, etc. have been advocated but none of them are able to prevent moisture diffusion particularly when applied in the limited amounts as necessary to avoid altering the appearance, shape, and flavor of the fruit.

It has been noticed that when raisins are coated with such agents as waxes, the coating is not imperforate as might be expected but actually contains pin-holes or other apertures. This defect, it has been determined, is caused by localized deposits of sugar (usually in the form of syrup) on the surface of the raisins. All raisins contain such deposits to a greater or lesser degree. Usually raisins which have been stored exhibit larger proportions of these sugar deposits than freshly prepared raisins. In many cases there areas of sugar are localized about the crests of the skin folds. Although these sugar deposits are small and can hardly be detected with the naked eye, they somehow prevent continuity in the wax coating thus providing avenues by which moisture can diffuse into, or out of, the wax-coated raisins. Microscopic examination of wax-coated raisins has revealed that apertures in the wax coating coincide with deposits of sugar on the raisin surface.

It has now been found that the defects described above may be eliminated by first coating the raisins with a polysaccharide, such as starch, and then applying the wax coating. It has been observed that in such case the wax coating is continuous and essentially free from pin-holing. The polysaccharide coating provides a barrier which permits the waxy material to form an imperforate film over the sugar deposits. The net result is that the process of the invention leads to products which may be stored for long periods of time without loss or gain in moisture content regardless of the humidity of the atmosphere within which they are kept. For example, raisins coated in accordance with the invention will not dry out when stored in arid atmospheres nor become sticky or moldy when stored in humid atmospheres. Moreover, raisins coated in accordance with the invention and packed with cereal products will retain their original plumpness and softness for long storage periods. In addition to the above benefits, the coating film in accordance to this invention provides an adherent, edible, glossy, smooth, dirt-resisting coating which also serves to hold the food material together and prevents disintegration during storage, shipping, and so forth. It also offers resistance to the action of bacteria, fungi, oxygen, etc. The film is especially useful to encase normally sticky food products such as dried or candied fruits. The material so encased is no longer sticky and the individual units of food remain separate and non-coherent even after packaging and storage, including storage in humid atmospheres. This faculty of maintaining the units separate and non-coherent is a very valuable property as containers may be filled by automatic machinery and the consumer may serve portions by spilling out the material much as sand or gravel could be poured from a container. Such action is to be contrasted with the usual tendency of dried or candied fruit products to stick together requiring hand packaging in the factory and separation of desired portions by the consumer by tearing apart of clumps with the fingers. Additionally, the film coatings in accordance with the invention are essentially odorless and tasteless and thus do not detract from the aroma and taste of the food itself. Where the products are consumed directly they may be eaten right with the coating intact; if the coated food article is to be cooked before eating, as by boiling in water, then the film will disintegrate in the cooking water and thus be removed.

Although starch is the preferred agent for the initial coating in accordance with the invention, one may employ other polysaccharides which have a molecular weight above 5,000 and which are capable of forming compositions of pasty to gelled texture with water. Typical examples of such polysaccharides are starch, methyl cellulose, carboxymethyl cellulose, pectin, low-methoxyl pectinic acids, mannan, galactan, dextran, xylan, algin, gum arabic, gum tragacanth and the like. Sugars, having molecular weights below 5,000, are not included nor is cellulose which has too high a molecular weight to be soluble in water and which does not form pastes or gels with water. The polysaccharides included within the scope of the invention have molecular weights in the proper range to form the desired barrier between the hydrophillic sugar syrup deposits and the hydrophobic wax coating. On the other hand, sugars because of their high water solubility and cellulose because of its complete lack of water solubility will not function to provide the barrier of the desired character.

The polysaccharide may be applied to the raisins or other food articles in any convenient manner. Usually it is preferred to simply apply the polysaccharide as the dry, pulverulent material to the food. For example, a quantity of raisins and starch powder are placed in a drum and rotated for several minutes. The raisins are then separated from excess starch and are ready for the wax coating. In the alternative, the polysaccharide may be dissolved in water and the resulting solution applied to the food by spraying, dipping, or the like. The coated raisins after draining are dried, for example by simply allowing them to stand or preferably by exposing them to a current of warm air. Coating with the polysaccharide in dry pulverulent form is preferred as the drying step is eliminated and the powder tends to stick particularly to areas of the raisin surface which have sugar syrup deposits. This is of course desirable as these are the areas which one wants to be provided with the barrier coating. It is obvious that the amount of polysaccharide is limited to form a thin film on the food so that the original shape and contours of the food article are not altered.

It will be observed that the fruit coated with the polysaccharide generally exhibits a dusty or milky appearance. That is, the polysaccharide deposit is opaque, particularly when the coating is done by application of the polysaccharide in dry powdered form. However, this opacity does not persist. When the wax coating is applied the complete coating is transparent and no trace of the originally milkiness or dustiness remains. Whether this change from opacity to transparency is an optical effect or caused by some physical or chemical alteration, is not known. Regardless of the theory, however, the change is a desirable one as the final product has a natural appearance in that the film coating is virtually invisible.

After the polysaccharide has been applied, the raisins or other food articles are provided with a wax coating. Coating with the wax composition may be accomplished by any of the well-known techniques of the coating art. For example, the wax composition may be dissolved in an inert, volatile solvent such as hexane and the solution applied to the food by dipping or spraying, any residual solvent then being allowed to evaporate from the coated food. A preferred technique involves applying to the surface of the food the wax composition in molten form. For example the food articles may be dipped in a pool of the molten wax composition, removed therefrom and allowed to drain while spread on a screen or other perforated surface. As the liquid coating cools by exposure to air it will solidify to form the desired film coating. Cooling may, of course, be hastened by subjecting the coated articles to a draft of cool air. Instead of applying the coating by dipping, spraying can be used. Thus the molten wax composition is sprayed onto the food articles while they are tumbled in a rotating drum. After the spraying the coated articles are tumbed until the coating is set thus to prevent any cohesion of the individual articles. It is obvious that the amount of wax composition applied to the food is limited to form a thin film coating which does not alter the shape or appearance of the food article.

For the wax coating, beeswax is preferred. However other waxes such as carnauba, candelilla, spermaceti, etc. may be employed. Usually the wax itself provides a too-brittle coating which does not well resist the stresses normally encountered by the coated product as in movement of the product in commerce. For this reason it is preferred to employ a mixture of wax and a plasticizer to provide a more flexible film coating. As the plasticizer one may employ lecithin but it is preferred to acetylated glycerides. Such compounds are preferred as they make the wax film more flexible yet do not materially reduce its impermeability to moisture, nor make it greasy or oily, nor render it susceptible to oxidation.

The acetylated glycerides which may be used in conjunction with the wax are esters of glycerine containing the acyl radicals of both acetic acid and a long chain fatty acid. Since the glycerine molecule contains three hydroxy groups available for esterification, one may obtain compounds containing one acetic acid group and one or two higher fatty acid groups and compounds containing two acetic acid groups and one higher fatty acid group. Specific examples of these compounds, given by way of illustration, are glycerine monoacetate-monolaurate, glycerine monoacetate-dilaurate, glycerine monoacetate-monomyristate, glycerine monoacetate-dimyristate, glycerine monoacetate-monopalmitate, glycerine monoacetate-dipalmitate, glycerine monoacetate-monostearate, glycerine monoacetate-distearate, glycerine monoacetate-monoarachidate, glycerine monoacetate-diarachidate, glycerine diacetate-monolaurate, glycerine diacetate-monomyristate, glycerine diacetate-monopalmitate, glycerine diacetate-monostearate, glycerine diacetate-monoarachidate.

It is also to be observed that in the compounds containing two higher fatty acids, both of these need not be the same. Thus, for example, one may use glycerine monoacetate-monopalmitate-monostearate. Moreover, the acetylated glyceride need not be a pure individual compound but may be a mixture of compounds within the category of acetylated glyceride esters of higher fatty acids. The usual methods of producing the acetylated glycerides starting with the natural oils and fats such as tallow, lard, cottonseed oil, soybean oil, peanut oil, and the like lead to the production of such mixtures. Thus for example a preferred material for use in accordance with the invention is prepared from hydrogenated lard and contains 25% of monoacetylated hydrogenated lard fatty acid monoglycerides and 65% of diacetylated hydrogenated lard fatty acid monoglycerides. It is preferred that the higher fatty acid groups in the acetylated glycerides be for the most part saturated, hence resistant to oxidation. Accordingly it is desirable that the acetylated glycerides be prepared from hydrogenated oils or fats or from oils or fats which naturally are high in glycerides of saturated higher fatty acids (tallow, for example).

The amount of acetylated glyceride to be added to the wax may be varied over a wide range. The wax alone produces a film coating which is hard and brittle so that it chips easily on handling of the coated food article. In contrast the coatings of wax plus acetylated glyceride are flexible so that the coated article may be handled in normal manner without danger of chipping or rupturing the coating. Moreover, the acetylated glyceride exhibits this plasticising effect without causing the coating to exhibit any greasy feel or appearance. Moreover, the acetylated glycerides are resistant to oxidation so that there is no danger that rancidity of the coating will develop on storage. As noted above the proportion of acetylated glyceride may be varied widely, the greater the proportion of acetylated glyceride, the more flexible the coating. There is considerable variation in melting point of the various acetylated glycerides and it is evident that with a low melting point acetylated glyceride a lesser proportion thereof will be required to achieve a desired degree of flexibility than with an acetylated glyceride of higher melting point. It is evident that the proportion of acetylated glyceride may be varied as desired to prepare film coatings of various degrees of flexibility as may be desirable and consistent with the food to be coated and the conditions under which the food is to be stored. For example, if the coated food is to be stored at summer temperatures less acetylated glyceride is used than with a food to be stored at winter temperatures. Also, a product that it is expected to be subjected to excessive handling or other mechanical stresses would require a coating of more flexible character than one which in the normal channels of trade would be expected to be protected from undue shock, abrasion, etc. Considering these factors the ingredients may be employed in the proportions of 10 to 90% wax and 10 to 90% acetylated glyceride, these percentages being by weight based on the weight of the entire coating composition.

Various materials may be incorporated in the polysaccharide or wax composition in minor proportion to give the coatings certain characteristics as may be desired.

For example, one may incorporate dyes or pigments to form colored coatings. Mold inhibiting agents may be incorporated to give the coatings greater protective value as regards resistance to spoilage organisms. For example, about 0.1% of ethyl parahydroxybenzoate may be added to the wax composition to give the film mold-inhibiting properties. Other agents of this type which may be used are, for example, methyl parahydroxybenzoate, sodium parahydroxybenzoate, sodium benzoate, ethyl vanillate, sorbic acid, etc. Flavoring agents may be added to the compositions to give the coatings a desired odor and/or taste. For example, monosodium glutamate, meat extracts, protein hydrolysates, salt, fruit essences or extracts, spices, condiments, sweetening agents, and so forth may be added as is consistent and desirable with the type of food being coated. Antioxidants may be incorporated in the compositions to give the film antioxidant properties which are desirable for instance in the treatment of foods containing fats or other substrates susceptible to oxidation. Suitable antioxidants are, for example, ascorbic acid; butylated hydroxy anisole; ethyl gallate; propyl gallate, lauryl gallate; dilauryl thiodipropionate; chlorogenic acid; catechol monobenzoate; N,N'-di-sec-butyl-p-phenylene diamine; 2-tert-butyl, 4-methoxy phenol; p-isopropoxy diphenylamine; 2,5-ditertiary butyl hydroquinone; 2,5-dibenzyl hydroquinone; 2,5-ditertiary amyl hydroquinone; diphenyl p-phenylene diamine; p-hydroxy diphenylamine; N-sec-butyl p-aminophenol; ethyl hydrocaffeate; thiodipropionic acid; 6-ethoxy-2,4-trimethyl-1,2-dihydroquinoline; 6-phenyl-2,2,4-trimethyl-1,2 - dihydroquinoline; 2,2,4-trimethyl-1,2-dihydroquinoline; nordihydroguaiaretic acid; p-tert-butyl catechol; ascorbyl palmitate, and so forth. These antioxidants are particularly useful where the food is of an oily nature (nuts, for example) and are therefore prone to rancidification. Only a small proportion of the antioxidant is required—on the order of 0.05 to 1% based on the weight of coating material. The coating can also be employed to add vitamins or other nutrients to the food being coated. Thus vitamins, vitamin precursors, or nutritionally important mineral salts may be added to the coating composition. It is evident from the description above that one may incorporate in the composition any type of material to give the coating any desired property from the standpoint of color, preservative action, increasing of flavor or nutritive value and so forth.

It is a critical factor in the process of the invention that the polysaccharide and wax composition be applied sequentially to the food article. In this way the polysaccharide can properly be applied to the sugar deposits to form a pellicle thereover which subsequently can be filmed over, without pinholing, by the wax coating. On the contrary, were the polysaccharide to be incorporated with the wax composition this desirable effect could not be attained. Indeed such procedure would yield a wax coating containing particles of polysaccharide which would provide the avenues for ingress or egress of moisture.

The invention may be utilized to form the described coatings on foods of all varieties. The invention finds greatest field of importance in the coating of food products which carry surface deposits of sugar. Typical examples of such are the dried or candied fruits such as raisins, figs, dates, prunes, dried cherries, dried apricots, candied citron, candied citrus peel, etc. The invention can also be employed for coating such food products as meat products for example sausage, ham, bacon, smoked fish, smoked fowl; pellets or tablets of compressed dried food such as dried eggs, dried milk, dried soup; dairy products such as butter and cheeses; flavorings; spices; candies and confections; frozen meats and vegetables and fruits; nuts; and so forth.

As noted above, foods coated in accordance with the invention may be packaged with cereal products and stored under such conditions without exhibiting the usual drying-out effect characteristic of the uncoated foods. For preparing mixed products of this type the coated food which may be, for example, coated raisins, figs, dates, dried prunes, or other dried fruit (whole or in pieces) is mixed with a suitable proportion of cereal and packaged in the usual way. The cereal may be, for instance, any of the flaked, puffed, or otherwise shaped forms of corn, wheat, rice, oats, barley, bran, etc. and may contain the usual flavoring components such as salt, sugar, and malt.

The invention is further demonstrated by the following illustrative examples:

Example I

A mixture was prepared containing 80% beeswax and 20% of acetylated glyceride. The latter was a commercial product prepared from fully hydrogenated lard and containing 65% diacetylated monoglycerides of hydrogenated lard fatty acids, 25% of monoacetylated monoglycerides of hydrogenated lard fatty acids, 8% of monoglycerides of hydrogenated lard fatty acids and the remainder acetylated glycerine and acetylated diglycerides. The mixture of beeswax and acetylated glyceride was heated sufficiently to melt it (about 136–147° F.) to prepare it for coating raisins.

(a) A batch of raisins (18% moisture) was tumbled for a few minutes in a drum with a commercial acid-converted corn starch in dry powder form. The starch-coated raisins were removed from the drum then immersed in the warm melt of wax and acetylated glyceride. The raisins were removed, drained, and cooled on a screen.

(b) Another batch of the same raisins was coated with the wax-acetylated glyceride composition without first applying the starch coating.

It was observed that both batches of raisins were coated with a transparent, adherent, glossy, non-coherent, non-greasy film coating. Microscopic examination of the two products showed that the raisins of batch (a) were covered with a film coating which was virtually free from pin holes whereas the film coating of batch (b) contained many pin holes.

Both batches of coated raisins had a sample of the original uncoated raisins were stored in a disiccator over $CaCl_2$ for 3 weeks. After this period the moisture content of each sample was determined by the loss in weight during the storage period. The results obtained are tabulated below.

| Expt. | First coating | Second coating | Loss of moisture after 3 weeks in desiccator, percent |
|---|---|---|---|
| a | starch | beeswax and acetylated glyceride. | 5.7 |
| b | none | ____do____ | 7.3 |
| c | none | None (control) | 10.0 |

Example II

A lot of raisins (14% moisture) was coated with various polysaccharides as described below—

(1) One batch of raisins was coated with dry powdered starch (acid converted corn starch) as described in Example I.

(2) Another batch of raisins was dipped in a 2% aqueous solution of the same starch, the starch solution being kept hot (160° F.) during the dipping. The raisins were removed from the starch solution, drained, and dried in warm air.

(3) Another batch of raisins was coated with the same solution of starch as in part 2 but in this case the solution was at room temperature.

(4) and (5) Batches of the raisins were coated with dry, powdered methyl cellulose (4) and dry, powdered sodium carboxymethyl cellulose (5) employing the tumbling method as described in Example I.

All five batches of polysaccharide-coated raisins were then coated with a composition of 80% beeswax and 20% acetylated glyceride as in Example I.

The results after storing 3 weeks in the desiccator are set forth below:

| Expt. | First coating | Second coating | Loss in moisture, percent |
|---|---|---|---|
| 1 | starch (powder) | beeswax and acetylated glyceride. | 2.0 |
| 2 | starch | do | 3.4 |
| 3 | do | do | 2.8 |
| 4 | methyl cellulose | do | 3.6 |
| 5 | carboxymethyl cellulose. | do | 3.4 |
| 6 | none | none (control) | 6.0 |

Having thus described the invention, what is claimed is:

1. The process which comprises coating a food, which initially has surface deposits of sugar, with a polysaccharide which has a molecular weight of at least 5,000 and which forms compositions of pasty to gelled structure with water, then applying a wax coating over the polysaccharide-coated food.

2. The process of claim 1 wherein the food is raisin.

3. The process of claim 1 wherein the polysaccharide is starch.

4. The process of claim 1 wherein the polysaccharide is methyl cellulose.

5. The process of claim 1 wherein the polysaccharide is carboxymethyl cellulose.

6. A food, which initially has surface deposits of sugar, carrying a surface coating of a polysaccharide which has a molecular weight of at least 5,000 and which forms compositions of pasty to gelled structure with water, and an outer coating of wax over the polysaccharide coating.

7. The product of claim 6 wherein the food is raisin.

8. The product of claim 6 wherein the polysaccharide is starch.

9. The product of claim 6 wherein the polysaccharide is methyl cellulose.

10. The product of claim 6 wherein the polysaccharide is carboxymethyl cellulose.

11. A process for providing dried fruit with a thin, edible, transparent, glossy, non-coherent, moisture-resistant casing which comprises coating the fruit with dry, pulverulent polysaccharide selected from the group consisting of starch, methyl cellulose, and carboxymethyl cellulose and then coating the polysaccharide-coated fruit with wax.

References Cited in the file of this patent

UNITED STATES PATENTS

| | | |
|---|---|---|
| 1,510,679 | Kataprowsky | Oct. 7, 1924 |
| 1,585,370 | Brogden | May 18, 1926 |
| 1,738,864 | Brogden | Dec. 10, 1929 |
| 2,558,042 | Cornwell | June 26, 1951 |
| 2,611,708 | Owens | Sept. 23, 1952 |
| 2,622,033 | Fusco | Dec. 16, 1952 |
| 2,790,720 | Novak | Apr. 30, 1957 |